2,773,742
Patented Dec. 11, 1956

2,773,742
PREPARATION OF COMPLEX HYDROXIDES OF PLATINUM AND PALLADIUM

James E. Connor, Jr., Drexel Hill, Pa., assignor to The Atlantic Refining Company, Philadelphia, Pa., a corporation of Pennsylvania No Drawing. Application June 2, 1954,
Serial No. 434,061

11 Claims. (Cl. 23—183)

This invention relates to the manufacture of complex metal hydroxides and particularly to the manufacture of complex platinum hydroxides and complex palladium hydroxides in which the metal is in the cation in aqueous solution.

The use of platinum-containing compounds has increased markedly in recent years, particularly for the impregnation of various solid carriers to produce platinum-containing catalysts. Such catalysts have gained widespread use in hydrocarbon conversion processes such as catalytic reforming, dehydrogenation of specific cycloparaffinic stocks to produce aromatics, isomerization of paraffins and alkyl aromatics and similar reactions. Palladium which bears a close resemblance to platinum, has also been suggested for such uses.

The usual method of impregnating carrier materials with platinum or palladium is to contact the carrier with an aqueous solution of chloroplatinic acid or chloropalladic acid following which the carrier is drained, dried, and the platinum or palladium reduced to the metallic state by hydrogenation. It also has been proposed that carriers which have exchangeable hydrogen ions in their lattice structure be impregnated with platinum or palladium compounds in which the metal is in the complex cation when the compound is in aqueous solution. Acidic metal oxide combinations such as alumina-silica, alumina-silica-zirconia, silica-zirconia, silica-thoria and the like, are well-known examples of carriers containing exchangeable hydrogen ions.

Salts which have been suggested for use with carriers having exchangeable hydrogen ions include such compounds as platinuous tetramminochloride, $[Pt(NH_3)_4]Cl_2$, platinic hexamminochloride $[Pt(NH_3)_6]Cl_4$, and the like, wherein the platinum is contained in the cation in aqueous solution. If such salts are used, it is necessary to add sufficient base, such as ammonium hydroxide, to raise the pH of the solution to at least 9 in order to obtain the desired base exchange. During the impregnation of the carrier, the hydrogen ions are replaced by the complex platinum cations and the chloride ions remain in solution. Similarly, in those cases where the sulfate, nitrate, or other salt is used, such as platinuous tetramminosulfate, the corresponding anion will be found in the solution after impregnation. The complex hydroxide compounds, however, are strongly alkaline and will raise the pH of the impregnating solution to 12 or more, so that it is unnecessary to add another base in order to obtain ion exchange. In addition the hydroxide does not produce any undesirable anions during impregnation. For example, if platinous tetramminohydroxide is used to impregnate an acidic metal oxide carrier, the platinous complex cation will replace the hydrogen ion which in turn is neutralized by the hydroxyl ion to give water.

The complex platinous or platinic hydroxides, however, according to the rather meager literature on the subject, heretofore have been prepared only with considerable difficulty and, in fact, many have never been prepared. The method of producing the platinous tetrammino-hydroxide, for example, according to the prior art, involved adding an aqueous solution of barium hydroxide to a solution of platinuous tetramminosulfate, filtering, and evaporating the filtrate out of contact with air and finally in vacuo over sulfuric acid. Extreme care was required to keep the product from becoming contaminated with barium compounds. The corresponding compound of palladium, palladous tetramminohydroxide, has been prepared in the same manner. All of the methods described for producing the complex hydroxides of platinum and palladium require rather expert and painstaking techniques which can be accomplished in the laboratory, but which are totally unsuitable for large scale production.

It is, therefore, an object of this invention to provide a novel method of preparing the complex hydroxides of platinum or palladium from their corresponding salts in which the metal is in the cation in aqueous solution.

It is an additional object of this invention to provide a method of producing the complex hydroxides of platinum or palladium in which the metal is in the cation in aqueous solution which is readily adaptable to large scale production and which produces products of high purity.

According to the instant invention an aqueous solution of a complex platinum or palladium salt in which the metal is in the cation is passed over a bed of an anion exchange resin which has previously been converted to the hydroxyl cycle by the use of sodium hydroxide or similar hydroxide. The usual conditions are room temperature and atmospheric pressure, however, if the particular salt is only sparingly soluble in water, somewhat higher temperatures may be used in order that more of the salt will dissolve in the aqueous solution. The effluent from the anion exchange bed is an aqueous solution of the corresponding complex platinum hydroxide or complex palladium hydroxide.

The concentration of the salt solution to be passed over the anion exchange bed may be varied over relatively wide ranges. It should be noted, however, that since there will be some hold-up of solution in the bed, the concentration of the salt solution should be kept low in order to minimize the amount of platinum or palladium held-up in solution in the bed when the capacity of the bed for exchange has been reached. Lower concentrations are preferred also since the capacity of the resin for removal of the anion should be several times greater than the volume of solution required to wet the resin bed. If the platinum or palladium is to be used in reforming catalyst manufacture wherein the metal on the carrier ranges only up to 2.5 percent and ordinarily is about 0.5 percent, solutions ranging between 0.02 molar and 0.04 molar are very desirable since the resulting hydroxide solution having approximately the same concentration can then be used directly for impregnation of the carrier. If higher concentrations of platinum or palladium are required more concentrated solutions can be passed over the exchange bed or alternatively the hydroxide solution can be concentrated by evaporation.

The rate at which the salt solution is passed through the anion exchange resin will depend on the depth of the bed, the concentration of the solution and similar factors. Bed depth to bed diameter ratios and minimum bed depths are recommended by resin manufacturers for optimum results with their particular resin. In addition, manufacturers recommend optimum flow rates.

Numerous complex platinum or palladium salts in which the metal is in the cation in aqueous solution can be converted to the corresponding hydroxides by the method of this invention. These include: the platinous salts represented by the general formula $[Pt(A)_4]R_2$ where A may be $NH_3$, $H_2O$, pyridine, aniline, $NH_2OH$, $CH_3NH_2$, and similar groups or combinations thereof, and R may be the chloride, bromide, iodide, nitrate, nitrite, sulfate, etc., for example, platinous tetramminochloride, $[Pt(NH_3)_4]Cl_2$; the platinous acido-salts represented by the general formula $[Pt(A)_3R]R$, where A and R are defined as above, for example, $[Pt(NH_3)_3(OH)]Cl$; the platinic salts represented by $[Pt(A)_6]R_4$, for example, $[Pt(NH_3)_6]Cl_4$, platinic hexamminochloride; the platinic acido-salts $[Pt(A)_5R]R_3$, for example, $$[Pt(NH_3)_5(OH)]Cl_3$$

the platinic diacido-salts represented by $[Pt(A)_4(R)_2]R_2$, for example, $[Pt(NH_3)_4(OH)_2]Cl_2$; the platinic triacido-salts represented by $[Pt(A)_3(R)_3]R$; and the diplato-ammino salts. In nearly all of the above complex compounds, the chlorides, bromides, iodides, nitrates, nitrites and sulfates, have been prepared as well as the carbonates in a few of the cases. Very few hydroxides have been reported: however, with the novel method of the instant invention the abovementioned types of salts are readily converted to the hydroxides. It is to be noted that only the ion or ions outside of the brackets in the formulas of the compounds set forth above are exchangeable. For example, if $[Pt(NH_3)_3Cl]Cl$ is passed over the anion-exchange resin the resulting effluent will contain the compound $[Pt(NH_3)_3Cl](OH)$. Some of the salts are only sparingly soluble in water, for example, the sulfates and carbonates. If it is necessary to use these salts the resulting hydroxide solution will likewise be dilute. The hydroxide solutions, however, can be readily concentrated by evaporation. Since the chlorides are quite soluble and easily prepared, they are the preferred compounds for conversion to hydroxides, however, as pointed out, any ionizable salt in which the platinum or palladium is in the cation may be used.

Palladium forms series of compounds identical to those of platinum described above and it has been found that such compounds can be converted to the corresponding hydroxides by the method of the present invention as described for the platinum compounds.

Numerous anion-exchange resins are available commercially and may be used in the present invention. Examples are the resinous reaction products of tertiary amines with haloalkylated vinyl aromatic hydrocarbon copolymers described in U. S. Patent No. 2,591,573, manufactured and sold by the Rohm and Haas Company, Philadelphia, Pennsylvania, under the designation Amberlite IRA-400. Similar resins available from other manufacturers are equally suitable for this invention. The resin should be in the hydroxyl cycle and preferably wet with water prior to use. After its capacity for conversion of the platinum complex to the hydroxide has become exhausted, the resins can be regenerated by contact with an alkali solution such as sodium hydroxide and then washed with distilled water. The wet resin is then ready for re-use.

Solutions of the abovementioned complex compounds of platinum and palladium before conversion to the hydroxide are essentially neutral. The effluent from the anion exchange, the complex hydroxide solution, is quite alkaline having a pH of 12 or more. Just before the total capacity of the bed for exchange has been reached, the pH of the effluent will start to fall, so merely by following the pH of the effluent it is possible to determine when to regenerate the anion exchange material.

The following examples are provided for the purpose of further illustrating the invention, and not for the purpose of limiting the invention to the conditions and compounds set forth therein.

EXAMPLE I

A 35 cc. bed of Amberlite IRA-400 anion exchange resin was treated with about 225 cc. of a 10 percent solution sodium hydroxide to convert it to the hydroxyl cycle, then the bed was thoroughly washed with distilled water. An aqueous solution of platinous tetramminochloride, approximately 0.022 molar, was percolated through the wet resin at the rate of 5 cc. per minute. Cuts were taken at approximately 10 minute intervals (50 cc. volumes) and the pH, platinum concentration, and chloride concentration determined for each cut. The results obtained are shown in Table I.

Table I

| Cut Number | Volume, cc. | pH | Platinum Molarity | Chloride Molarity |
| --- | --- | --- | --- | --- |
| 1 | 55 | 12.0 | 0.0074 | —* |
| 2 | 50 | 12.5 | 0.0192 | Trace |
| 3 | 50 | 12.6 | 0.0220 | —* |
| 4 | 50 | 12.6 | 0.0227 | —* |
| 5 | 50 | 12.6 | 0.0227 | Trace |

*Negative chloride test with $AgNO_3$.

It will be seen that there is some dilution of the platinum concentration in the first cuts because the resin was wet at the start of the percolation; however, in the succeeding cuts the concentration rises to the level of the incoming solution.

EXAMPLE II

A 125 cc. bed of Amberlite IRA-400 anion exchange resin was treated with 500 cc. of a 10 percent solution of sodium hydroxide and then washed with 2000 cc. of distilled water. An aqueous solution of platinous tetramminochloride 0.0214 molar, was percolated through the wet resin at the rate of 5 cc. per minute. Cuts were taken at hourly intervals (300 cc. volumes) and the pH and chloride concentration determined for each cut. The results are given in Table II.

Table II

| Cut Number | Volume, cc. | pH | Chloride Molarity |
| --- | --- | --- | --- |
| 1 | 300 | 12.5 | 0.0016 |
| 2 | 300 | 12.6 | 0.0026 |
| 3 | 300 | 12.6 | 0.0026 |

The effluent had a platinum molarity of 0.0187 because of the dilution effect of the wet resin at the start of percolation.

EXAMPLE III

A 275 cc. bed of Amberlite IRA-400 anion exchange resin was treated with 2000 cc. of a 5 percent solution of sodium hydroxide and then washed with 7000 cc. of distilled water. An aqueous solution of platinous tetramminochloride, 0.050 molar, was percolated through the wet resin at the rate of 4 cc. per minute. Cuts were taken at 100 cc. intervals and the pH and chloride ion determined on each cut. There was a negative chloride test with $AgNO_3$ obtained on each cut. In Table III the pH determinations are shown:

Table III

| Cut Number | Volume, cc. | pH |
| --- | --- | --- |
| 1 | 100 | 8.61 |
| 2 | 100 | 12.62 |
| 3 | 100 | 12.75 |
| 4 | 100 | 12.75 |
| 5 | 100 | 12.75 |

Cuts 2, 3, and 4 were composited and found to have a platinum concentration of 0.0446 molar, indicating excellent recovery.

EXAMPLE IV

Ammonium hydroxide was added to an aqueous chloroplatinic acid solution in an amount such that there were more than eight mols, of ammonium hydroxide per mol. of platinum. The small amount of precipitate formed was dissolved by agitation and mild heating. The solution was found to consist of a mixture of platinic ammine complex chlorides with all of the platinum in the cationic form. It is believed that these complex compounds include:

[Pt(NH3)6]Cl4, [Pt(NH3)5(H2O)]Cl4,
[Pt(NH3)4(H2O)2]Cl4, and other members of the series.

An aqueous solution of these complex chlorides having a platinum concentration of 0.0214 molar was percolated at the rate of 8 cc. per minute through a 100 cc. bed of wet Amberlite IRA–400 anionic exchange resin in the hydroxyl cycle. The effluent had a pH of 12.4 and a platinum concentration of 0.0199. The chloride analysis of the effluent corresponded to a concentration of only 0.002 molar which showed that the ion exchange was highly efficient in converting the chloride to the hydroxide.

EXAMPLE V

Sufficient ethyl alcohol was added to a composited sample of the aqueous solution of platinous tetramminohydroxide produced in Examples I, II and III to precipitate out the platinous tetramminohydroxide as crystalline solid. The solid was dried at room temperature out of contact with air since it was deliquescent and since it decomposed when heated to about 110° C. These findings are in accordance with the reported behavior of platinous tetramminohydroxide. The dried solid which contained an undetermined amount of water was analyzed for platinum, nitrogen, hydroxyl, and chloride. Since the exact amount of water contained in the sample was very difficult to determine, the weight ratios of the elemental analysis as found were compared with the theoretical weight ratios. The results are given in Table IV.

*Table IV*

|  | Theoretical | Found |
|---|---|---|
| Platinum to Nitrogen | 3.49 | 3.59 |
| Platinum to Hydroxide | 5.73 | 5.63 |
| Chloride | 0 | Trace |

These analytical data show that the platinous tetramminohydroxide can be produced in a highly pure form without contaminating side reactions.

EXAMPLE VI

A resin which had been used for several cycles was analyzed for platinum content. It was found to contain only about 0.007 percent platinum which indicated that only a negligible amount of platinum is adsorbed by the resin.

EXAMPLE VII

An aqueous solution of palladous chloride 0.04 molar, was admixed with a large excess of an ammonium hydroxide solution, approximately 16 mols. of ammonium per mol. of palladium. The mixture was heated to 140°–160° F. and agitated until the reddish precipitate dissolved to give a clear straw colored solution of the palladous tetramminochloride. This solution was cooled and diluted to about 0.03 molar palladium concentration. There was still an excess of ammonia in the solution so that it had a pH of 9.9 and it gave the usual chloride precipitate with the silver nitrate test.

The solution of palladous tetramminochloride was passed over 35 cc. of a wet Amberlite IRA–400 anion exchange resin in the hydroxyl cycle. The effluent had a pH of 12.5 and a negative chloride test indicating effective conversion of the palladous tetramminochloride to the corresponding hydroxide. This solution, after careful heating to remove excess ammonia, precipitated iron and copper from solution.

It has been found that some complex platinum or palladium ammine chlorides, as prepared, contain ammonium chloride as the predominant impurity. These crude chlorides can be used without purification as charge to the ion exchange reaction since the chlorides will be exchanged to produce the platinum or palladium complex ammine hydroxide and ammonium hydroxide in the effluent. The ammonia can be eliminated from the solution by boiling.

I claim:

1. A method of producing complex metal hydroxides selected from the group consisting of complex platinum hydroxides and complex palladium hydroxides in which the metal is in the cation in aqueous solution which comprises passing an aqueous solution of the corresponding complex metal salt selected from the group consisting of complex platinum salts and complex palladium salts over an anion exchange resin, the resin being in the hydroxyl cycle.

2. A method of producing complex platinum hydroxides in which the platinum is in the cation in aqueous solution which comprises passing an aqueous solution of the corresponding complex platinum salt over an anion exchange resin, the resin being in the hydroxyl cycle.

3. A method of producing platinic complex ammine hydroxides in which the platinum is in the complex ammine cation in aqueous solution which comprises passing an aqueous solution of the corresponding complex platinic ammine salt over an anion exchange resin, the resin being in the hydroxyl cycle.

4. A method of producing platinous complex ammine hydroxides in which the platinum is in the complex ammine cation in aqueous solution which comprises passing an aqueous solution of the corresponding complex platinous ammine salt over an anion exchange resin, the resin being in the hydroxyl cycle.

5. A method of producing platinous tetramminohydroxide which comprises passing a platinous tetrammino salt over an anion exchange resin, the resin being in the hydroxyl cycle.

6. The method according to claim 5 wherein the platinous tetrammino salt is platinous tetrammino chloride.

7. A method of producing complex palladium hydroxides in which the palladium is in the cation in aqueous solution which comprises passing an aqueous solution of the corresponding complex palladium salt over an anion exchange resin, the resin being in the hydroxyl cycle.

8. A method of producing palladic complex ammine hydroxides in which the palladium is in the complex ammine cation in aqueous solution which comprises passing an aqueous solution of the corresponding complex palladic ammine salt over an anion exchange resin, the resin being in the hydroxyl cycle.

9. A method of producing palladous complex ammine hydroxides in which the palladium is in the complex ammine cation in aqueous solution which comprises passing an aqueous solution of the corresponding complex palladous ammine salt over an anion exchange resin, the resin being in the hydroxyl cycle.

10. A method of producing palladous tetramminohydroxide which comprises passing a palladous tetrammino salt over an anion exchange resin, the resin being in the hydroxyl cycle.

11. The method according to claim 10 wherein the palladous tetrammino salt is palladous tetrammino-chloride.

References Cited in the file of this patent

UNITED STATES PATENTS

| 2,591,573 | McBurney | Apr. 1, 1952 |
| 2,606,098 | Bauman | Aug. 5, 1952 |

OTHER REFERENCES

"Ion Exchange Resins," by Robert Kunin and Robert J. Myers, 1950 ed., pages 128 and 135. John Wiley and Sons, Inc., New York.

"Ion Exchangers in Analytical Chemistry," by Olaf Samuelson, 1953 ed., pages 255, 261. John Wiley and Sons, Inc., New York.